(12) United States Patent
Rubenstein (10) Patent No.: US 7,363,865 B2
(45) Date of Patent: Apr. 29, 2008

(54) TRAY ADAPTED FOR MOUNTING ON A RAILING METHOD OF FABRICATION OF SAME

(76) Inventor: Jason Rubenstein, 29006 Ironwood La., Saugus, CA (US) 91390

( * ) Notice: Subject to any disclaimer, the term of this patent is extended or adjusted under 35 U.S.C. 154(b) by 0 days.

(21) Appl. No.: 11/507,091

(22) Filed: Aug. 21, 2006

(65) Prior Publication Data

US 2008/0041280 A1  Feb. 21, 2008

(51) Int. Cl.
 *A47B 23/00* (2006.01)
(52) U.S. Cl. ............................ 108/44; 108/47; 108/165
(58) Field of Classification Search ................. 108/44, 108/47, 45, 165; 224/276, 277, 482
 See application file for complete search history.

(56) References Cited

U.S. PATENT DOCUMENTS

| | | | | | |
|---|---|---|---|---|---|
| 2,770,513 | A | * | 11/1956 | Brown | 108/44 |
| 3,499,595 | A | * | 3/1970 | Brooks | 108/44 |
| 5,060,581 | A | * | 10/1991 | Malinski | 108/44 |
| 5,386,785 | A | * | 2/1995 | Naor | 108/44 |
| 5,413,035 | A | * | 5/1995 | Fernandez | 100/44 |
| 5,487,521 | A | * | 1/1996 | Callahan | 108/44 |
| 5,558,026 | A | * | 9/1996 | Seibert | 108/44 |
| 5,845,585 | A | * | 12/1998 | Meeus et al. | 108/44 |
| 6,457,421 | B1 | * | 10/2002 | Apichom | 108/44 |

* cited by examiner

*Primary Examiner*—Jose V. Chen
(74) *Attorney, Agent, or Firm*—Matthew F. Jodziewicz (57) ABSTRACT

A tray adapted for suspension from a railing edge includes a base panel having a pair of integral side panel tabs positioned on opposing sides of the base panel. An attachment panel, integral with a top portion of the base panel, is positioned between the pair of side panel tabs and folds along an attachment panel crease between a flat configuration and an angled configuration with respect to the base panel. The side panel tabs engage receiving slots located on the attachment panel to lock each tab in a fixed configuration for holding the attachment panel in an angled configuration to the base panel. A pair of generally J-shaped attachment tabs, integral with the attachment panel are positioned on opposing sides of a top portion of the attachment panel and fold along a crease between a flat configuration and a downwardly extending configuration from the attachment panel to form a hook adapted to engage a railing edge for suspending the tray therefrom. A method of constructing such a tray assembly is also disclosed.

15 Claims, 5 Drawing Sheets

TRAY ADAPTED FOR MOUNTING ON A RAILING METHOD OF FABRICATION OF SAME

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to trays, and more particularly to a collapsible tray adapted for mounting upon a railing. More specifically, the present invention pertains to a hanging table assembly for supporting a table which can be quickly and easily attached to a wall or railing in a removable manner. In an exemplary embodiment the support assembly is particularly adapted for use over a railing type structure, on a steering wheel, or on a partially lowered car window. It should be appreciated however, that the assembly of the present invention may be attached to other structures such as a boat railing, porch railing, balcony railing, chain link fence railing, and over the tailgate of a pickup truck. It is also envisioned that the assembly of the present invention can also be attached to walls as well as to railings. The present invention also includes a method of fabricating a collapsible tray assembly adapted for suspension from a railing edge.

2. Background of the Invention

In our ever increasingly mobile society, people are forced to spend increasing amounts of time in their vehicles which are forced to serve as mobile offices and dining areas for such road warriors. With the advent of drive-through restaurants, many people consume beverages and foods while sitting behind a steering wheel of a parked motor vehicle. A tray adapted for mounting in a vehicle, either from a steering wheel, a partially lowered window, or any suitable railing area, can provide a convenient holder for beverages and foods. Such a tray, for convenience, needs to be easily adaptable to the many different types of available mounting railings. For a non-limiting example, such a tray must be adapted if it is to be mounted on a steering wheel, to accommodate steering wheels having different sizes, shapes, and angles of inclination. Further, it needs to be easily storable in a small place within a motor vehicle, such as a glove compartment or a storage compartment under a seat, or in the alternative, to be sufficiently inexpensive to be discarded after use.

Various trays which can be mounted upon a steering wheel have been developed. For instance, U.S. Pat. No. 3,643,606 discloses a car tray having a pair of table sections, joined together via spring loaded hinges. The table sections are foldable toward and away from each other into a plurality of selectable positions via the hinges. Although the tray provides adjustability of a tray top with respect to steering wheel inclination, the construction of the tray is complicated by the utilization of the hinges. Further, the tray is bulky, making the car tray difficult to store in a car and expensive to manufacture.

U.S. Pat. No. 5,060,581 discloses a steering wheel tray which can be pivotally mounted on a steering wheel. The tray is suspended from a back panel by straps. The inclination of the tray relative to the steering wheel is adjusted by changing the length of the straps; an operation which requires the straps to be bunched together and brass brads to be inserted through slits in the straps. Since there are a finite number of slits, the adjustment capability of the tray is limited to a limited number of set positions. Further, the adjustability of the inclination of the tray is time-consuming because of the need first to bunch the straps and then insert the brads through the bunched straps.

U.S. Pat. No. 2,211,962 discloses a serving tray having a body, a U-shaped bail hingedly attached at opposite ends thereof to the body, and a pair of upright braces on the body. The braces include notched marginal portions for releasable interlocking engagement with legs of the bail such that the body and the bail are adjustable relative to each other. Because the braces are not retractable and the bail is relatively large, the tray cannot be conveniently stored in an automobile.

U.S. Pat. No. 6,457,421 issued to Apichom titled Tray Adapted for Mounting on a Steering Wheel discloses another tray adapted for mounting upon a steering wheel. The tray is comprised of a series of interlocking panels, one of which has an upwardly extending tab adapted to wrap around a top portion of a steering wheel and engage a slot on a panel to hold the tab in a locked configuration around the top portion of the wheel, thereby suspending the tray from the steering wheel. This structure is limited to those steering wheels having a structure whose upper portion is sufficiently open to allow wrapping a tab around its upper portion.

U.S. Pat. No. 5,558,026 to Seibert discloses a motor vehicle tray adapted for mounting on a steering wheel of a motor vehicle that has a support panel for supporting an article thereon and a main body panel connected to the support panel for suspending the support panel outwardly from the steering wheel at an angle. Side panels, which extend outwardly from the main body panel, are releasably attached to the support panel in such a manner as to permit the angle between the support panel and the steering wheel to be adjustable. Once again, this structure requires an accommodating steering wheel structure that will allow the upper part of the tray assembly to encircle the upper portion of the steering wheel. This invention is then once again dependent upon the type of steering wheel construction and size for its successful use.

All of these known tray assemblies incorporate structures that are limited in scope to being mounted on the steering wheel of an automobile. The table assembly of the present invention differs from known table assemblies in that it is designed to be compact and capable of being supported on a railing such as that created by a partially lowered automobile window, as well as on an automobile's steering wheel, and is further characterized by increased stability, convenience in use, economy of manufacture and storage.

SUMMARY OF THE INVENTION

The present invention overcomes the disadvantages and shortcomings of the prior art discussed above by providing a new and improved tray assembly capable of being mounted not only from different types of steering wheels, such as steering wheels having different sizes, shapes, and angles of inclination, but from nearly any railing or wall edge, such as the back of a seat, or even from a partially lowered car windows as well. More particularly, the present invention relates to a motor vehicle tray which includes a base panel for supporting items and an attachment supporting panel connected to the base panel for suspending the base panel outwardly from the railing or edge at a desired angle relative thereto. Side panel tabs, extending outwardly from the main body base panel, are provided with means for adjusting the angle between the base panel and the supporting structure.

Another feature of the present invention involves fabricating the tray assembly of the present invention from a body constructed from a unitary blank of flexible sheet material such as a plastic or cardboard sheet. Such construction permits the tray to be folded into a compact unit for easy storage in, for instance, a glove compartment of a motor vehicle and to be manufactured in an economical manner for mass production purposes.

OBJECTS AND SUMMARY OF THE INVENTION

Accordingly, the present invention has as non-limiting objects in its construction and use at least the following:

A tray assembly embodying the present invention is capable of being used with varying sized and shaped railings created by partially opened windows or steering wheels, thereby allowing it to be used in a larger number of differing locations and environments.

The present invention is embodied in a tray that can be hung from a railing edge, such as that formed by a partially opened car window, or a steering wheel and includes a base panel having a pair of integral side panel tabs positioned on opposing sides of the base panel and extending partially along the sides. Each tab folds along a side panel crease between a flat configuration and an upwardly extending configuration with respect to the base panel. An attachment panel integral with a top portion of the base panel is positioned between the pair of side panel tabs. The attachment panel folds along a crease between a flat configuration and an angled configuration with respect to the base panel. The side panel tabs engage receiving slots located on the attachment panel to lock each tab in a fixed configuration for holding the attachment panel in an angled configuration to the base panel. A pair of generally J-shaped attachment tabs, integral with the attachment panel, are positioned on opposing sides of a top portion of the attachment panel and fold along a crease between a flat configuration and a downwardly extending configuration from the attachment panel to form a hook adapted to engage a railing edge for suspending the tray from the railing.

DETAILED DESCRIPTION OF THE INVENTION

Referring now to the drawings, a tray assembly for support upon a steering wheel, partially opened automobile window edge, or railing edge deck that embodies the present invention will be described.

The invention, embodied in a tray assembly useful for holding food, electronic devices such as computers or day planners, is shown in the Figures and generally indicated by reference numeral 10.

Figure 1:
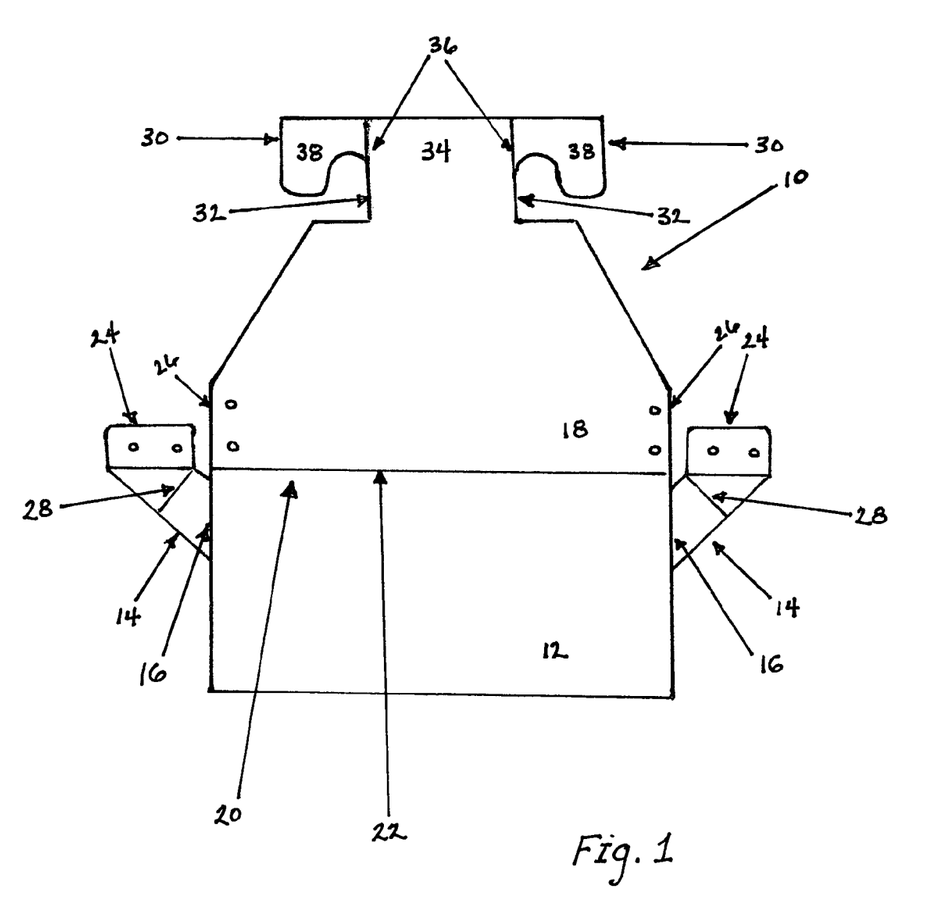
FIG. 1 is a plan perspective view of the preferred embodiment of the present invention, the invention being positioned in an unfolded configuration.

FIG. 1 illustrates tray assembly 10 having a base panel 12 preferably fabricated from a flexible single sheet of material such as plastic or cardboard. Base panel 12 has a pair of side panel tabs 14. Each tab 14 is preferably formed integral with base panel 12, and is positioned on opposing sides of the base panel and extends partially along the side. Side panel tabs 14 may also be formed separate from base panel 12 and attached by gluing and the like so that multiple components may be connected to form the inventive structure instead of a single unitary sheet construction, but such attachment and construction methods introduce greater complexity and cost into the manufacturing process and, while part of the present inventive scope, are less preferable than integral construction methods.

Figure 2:
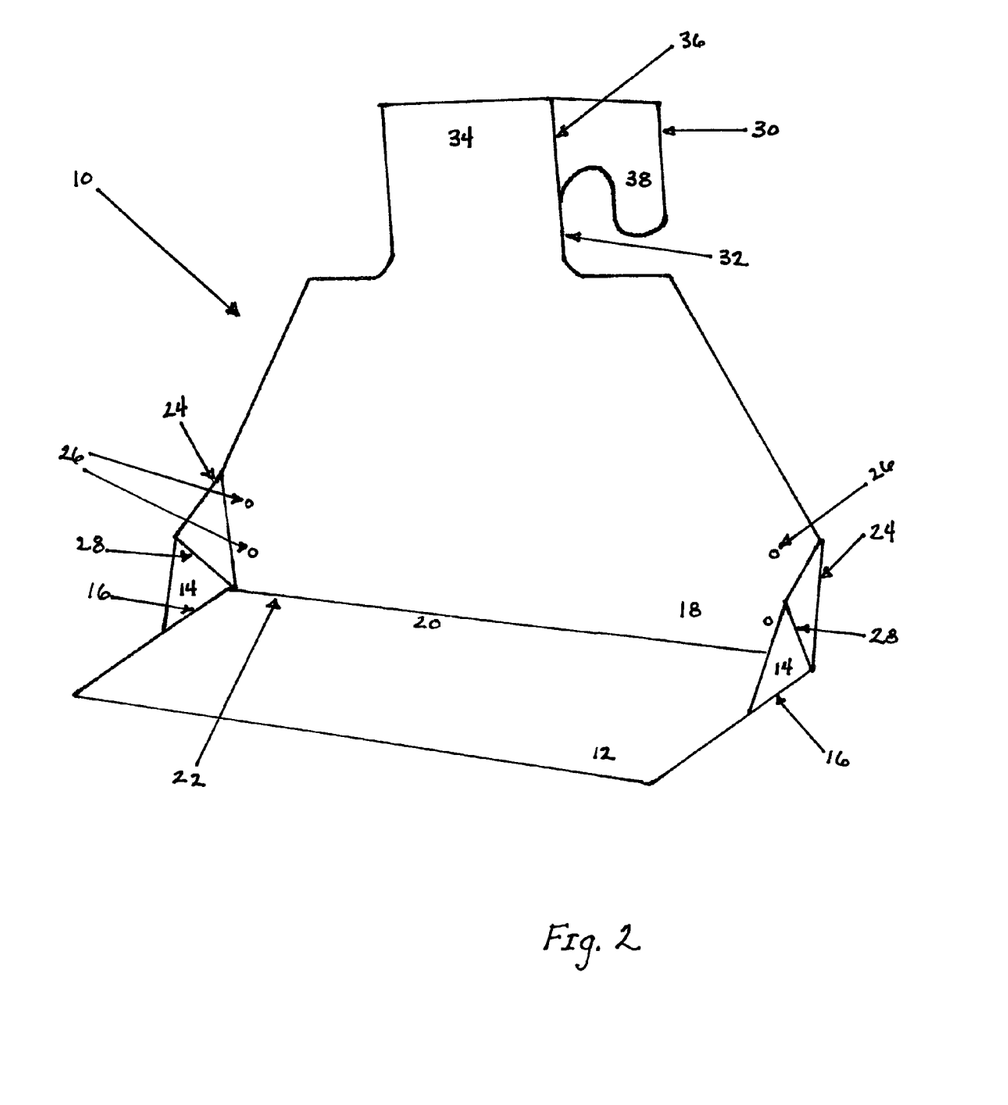
FIG. 2 is a perspective view of the invention in a folded configuration.
Figure 3:
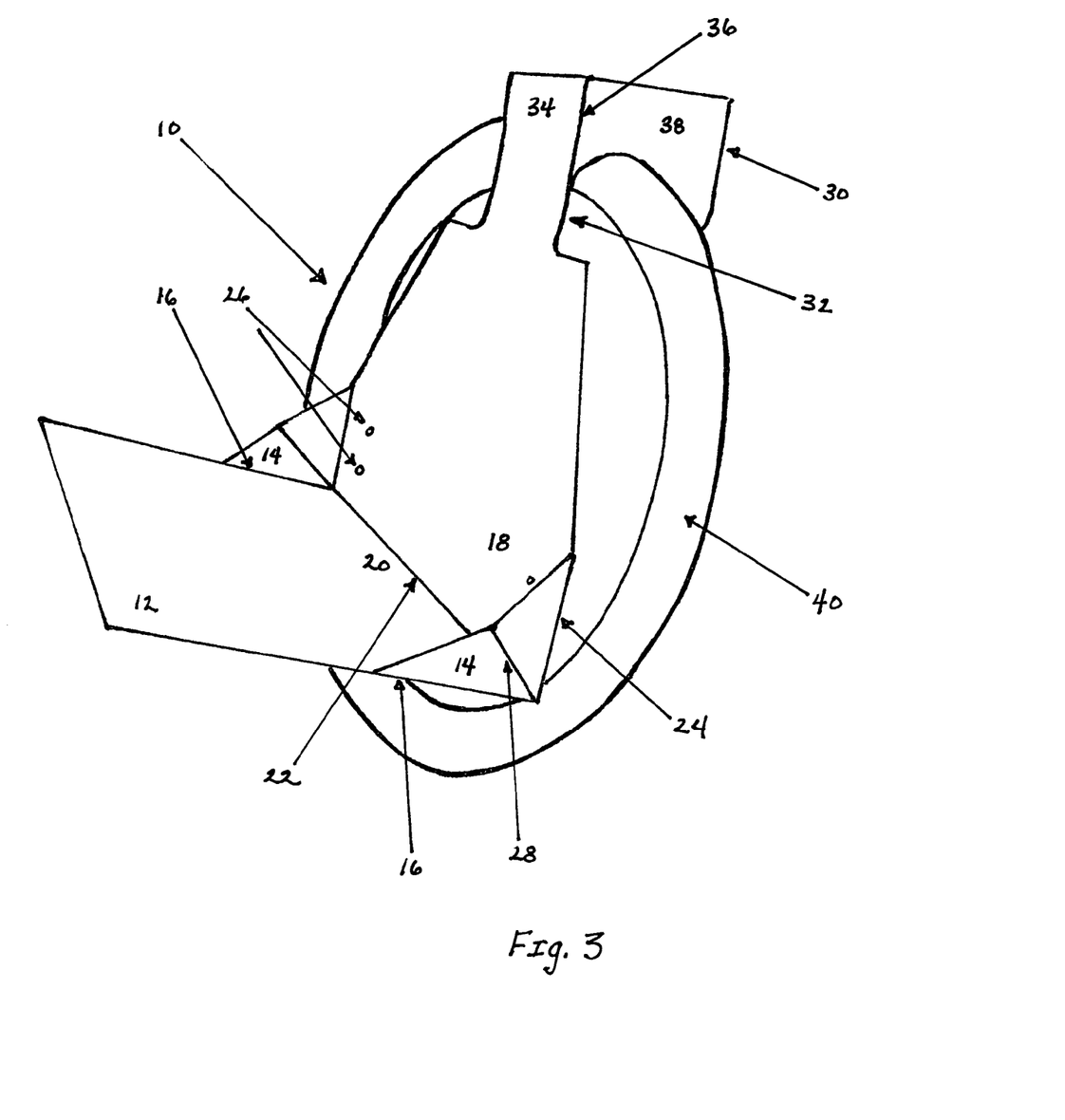
FIG. 3 is a perspective view of the invention attached to a steering wheel and operably positioned for use.

Each side panel tab folds along a side panel crease 16 between a flat configuration and an upwardly extending configuration with respect to said base panel as illustrated in FIGS. 2 and 3.

An attachment panel 18 is formed integral with a top portion 20 of base panel 12 and is positioned between the pair of side panel tabs 14. Attachment panel 18 folds along an attachment panel crease 22 between a flat configuration and an angled configuration with respect to base panel 12 once again as best seen in FIGS. 2 and 3.

An end portion 24 of each side panel tab 14 is shaped to engage removably one of a respective pair of side panel tab receiving slots 26 located on attachment panel 18. Tabs 14 are inserted into slots 26 to lock each the tabs in a fixed configuration for holding attachment panel 18 in an angled configuration to base panel 12.

Preferably, end portion 24 of each side panel tab is shaped to allow a user to select the amount the tab end is inserted into the attachment panel receiving slot to allow the user to select and vary the angle formed between the attachment and base panels in the angled configuration.

Additionally, it is preferred that each side panel tab 14 has a tab folding crease 28 intermediate the side panel crease 16 and the side panel tab end portions 24 to allow the base panel to be folded into a flat, collapsed configuration generally parallel the attachment panel when the side panel tabs are held in the side tab receiving slots in the attachment panel.

Side panel tabs 14 may also be fixedly held to attachment panel 18 by other well known methods such as a hook and loop material combination, adhesive tape, snap fasteners, or hot gluing the tabs to the attachment panel.

A pair of generally J-shaped attachment tabs 30 are formed preferably integral with attachment panel 18 and is positioned on opposing sides 32 of a top portion 34 of attachment panel 18.

Each of the J-shaped attachment tabs 30 fold along a crease 36 between a flat configuration and a downwardly extending configuration from the attachment panel to form a hook 38. Downwardly extending hook 38 is shaped to engage a railing edge (or steering wheel 40 as shown in FIG. 3) for suspending the tray.

Figure 4:
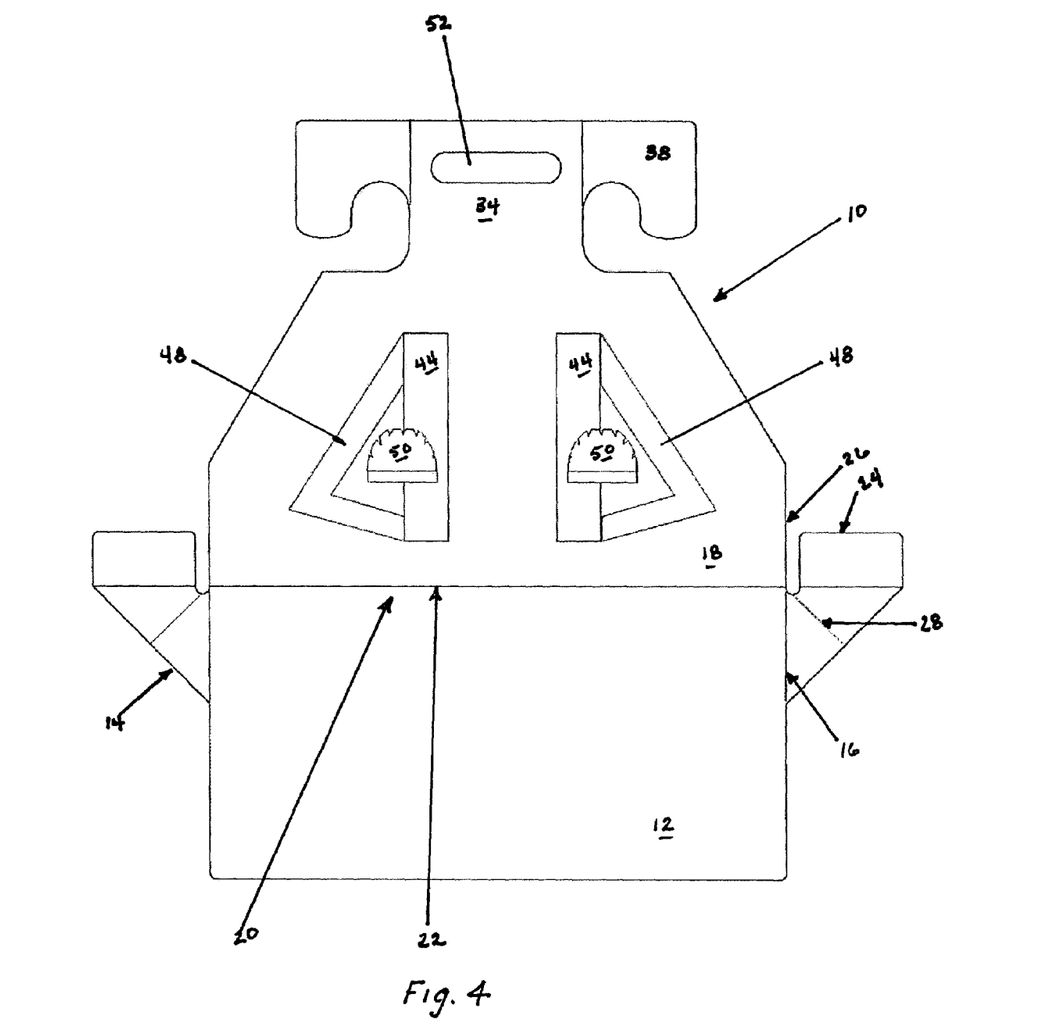
FIG. 4 is a back plan view of an alternate embodiment of the invention showing the tray as a free standing tray; and, FIG. 5 is a perspective view of an alternate embodiment of the invention.
Figure 5:
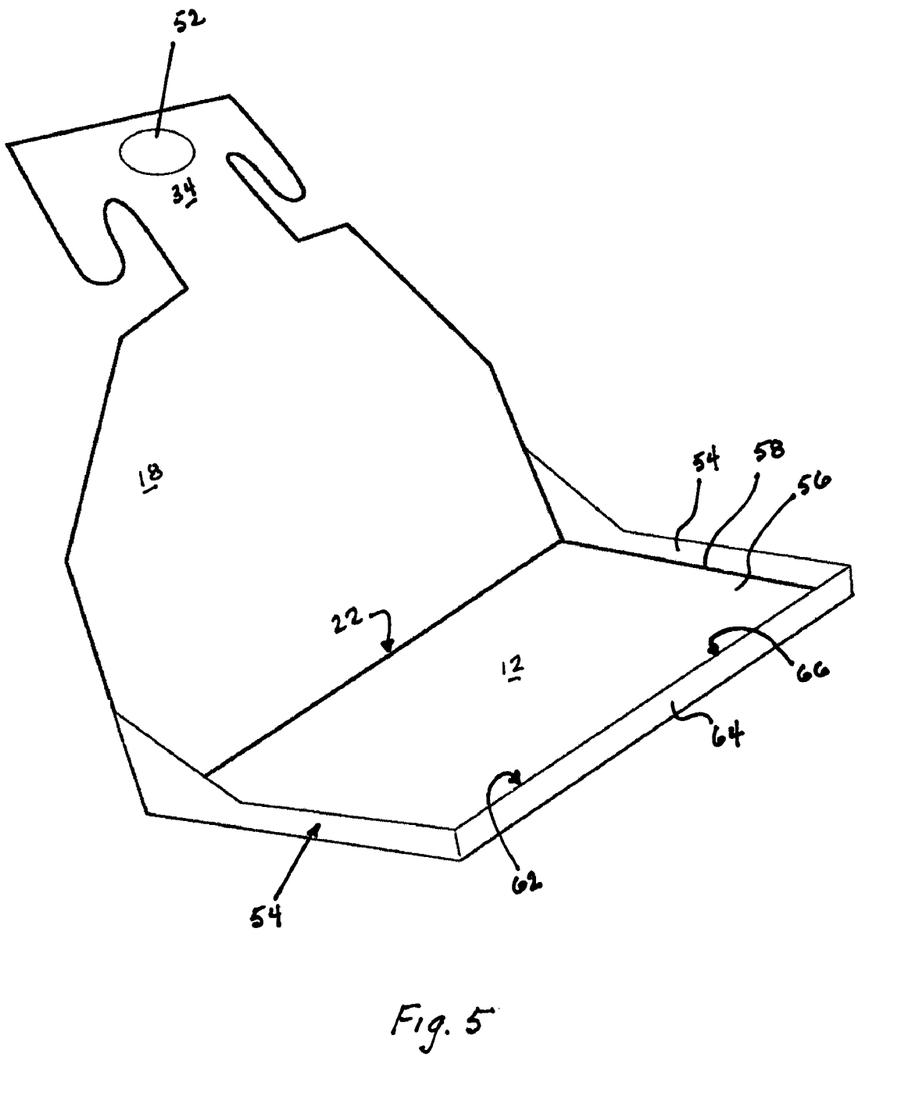

FIGS. 4 and 5 illustrate alternate embodiments of the present invention whose additional features will now be described. These Figures old reference numerals are similar to those described above and new reference numerals are described below.

In FIG. 4 the alternative embodiment tray assembly 10 is capable of being self-supporting in an upright position with the addition of a hinge 42 on the back side of attachment panel 18. Hinge 42 includes two portions. A first portion 44 of hinge 42 is fixedly connected to the back side 46 of attachment panel 18 by adhesive, or the like means, and a second portion 48, pivotally connected to first portion 44, is free to pivot outwardly from a first position adjacent the back side 46 of attachment panel 18 to a second extended position away from attachment panel 18 (as illustrated in FIG. 4) to provide a stand for supporting tray assembly 10 in an upright position on a generally flat surface.

A bracket 50 is preferably provided for securing the second portion 48 of hinge 42 in the second, outwardly extending position by a snap-locking fit.

Both hinge 42 and the snap-locking bracket 50 may be integrally cut from a single sheet of material and adhered to the back side 46 of attachment panel 18 for ease of construction and economy of cost, or may be integral with attachment panel 18 by being cut directly from attachment panel 18.

Likewise, hinge 42 may be constructed to have two second hinge portions 48 that extend outwardly in a generally parallel configuration so that bracket 50 may provide a snap-lock to hold both hinge second portions 48 extended in the second position.

A handle portion 52 is also preferred on the top portion 20 of attachment panel 18 for ease in holding and carrying the tray assembly. Various types of handles are possible, however, one preferred handle portion is to cut out a generally oval shaped portion of the top portion of attachment panel to provide a handle grip when the portion is folded out from attachment panel to provide a handgrip.

FIG. 5 illustrates another alternate embodiment of the present invention where tray 10 includes a base panel 12 having a pair of side panels 54, each of the pair of side panels 54 being integral with the base panel 12 and positioned on opposing sides 56 of the base panel 12. Each of the pair of side panels 54 folds along a side panel crease 58 between a flat configuration and an upwardly extending configuration. Attachment panel 18, integral with a top portion of base panel 12 and positioned between the pair of side panels 54, folds along an attachment panel crease 22 between a horizontal configuration and an angled configuration. A panel tab similar to that described above for each of the pair of side panels 54 is preferably hot glued to the back side of attachment panel 18 to hold each of the pair of side panels 54 in the upwardly extending configuration and attachment panel 18 in the angled configuration.

In the alternate preferred embodiment, the tray 10 further includes a bottom panel 64 that is integral with a bottom portion 62 of the base panel 12 opposite the top portion and positioned between the pair of side panels 54. The bottom panel 64 folds along a bottom panel crease 66 between a first configuration and a second configuration. Side panels 54 and bottom panel 64 are preferably hot glued together to hold the bottom panel 64 in the second configuration.

Additionally tray 10, as noted previously, is preferably constructed from a single flexible sheet such as paper, corrugated cardboard, or corrugated, flexible plastic. In this alternative embodiment the sheet is cut to form the base panel 12 having the pair of side panels 54 on opposing sides 56 of the base panel 12. The base panel 12 is further cut to have attachment panel 18 positioned between the pair of side panels 54. All of these cuts are preferably made simultaneously using a die or a computer controlled cutting mechanism, as is well known in the art.

The pair of side panel creases 58 is preferably also formed in the tray 10, each of the pair of side panel creases 58 being formed between the base panel 12 and one of the pair of side panels 54. The pair of side panel creases 58 facilitates the proper folding of the pair of sidewalls when the tray 10 is in use. Furthermore, the attachment panel crease 22 is formed between the base panel 12 and the attachment panel 18 to facilitate folding of the attachment panel 18, as described above. The pair of side panel creases 58 and the attachment panel crease 22 are formed by perforations or partial cuts formed by the die described above, or by pre-folding the pair of sidewalls and the attachment panel 18, typically using a computer controlled folding device. Such cutting and folding techniques are well known in the art and therefore do not warrant a more detailed description.

In the preferred embodiment, the die also cuts the bottom panel 12 opposite the top portion between the pair of side panels 54, and forms the bottom panel crease 66. The bottom panel 64 not only functions to hold items on the base panel 12, it also serves to strengthen the base panel 12 of the tray 10 and stabilize the pair of side panels 54 when they are folded to the upwardly extending configuration.

Additional embodiments of the present invention include shaping the tray assembly panels to act as a food tray for holding food or drink. The panels can also provide a working surface for individuals using their vehicle as a mobile office offering a table-like surface to hold computers or other electronic devices. Likewise, the panel portions described above may be formed to provide holes or recesses shaped to receive and hold specific items, such as cups, containers, or electronic devices in a secure manner to avoid their movement when a vehicle is in motion. Advertising or other information can be printed on the various panels, or areas can be provided on the panels to write information for future use or retention. All of these embodiments are also to be considered within the scope of the present invention as described and claimed for use in mobile environments as well as in static environments such as office cubicles or patios.

Furthermore, the present invention is also embodied in a method for manufacturing a tray adapted for mounting upon a steering wheel or railing edge as that of a partially opened vehicle window.

Such a method includes the steps of:

a) providing a sheet of flexible, yet sturdy material such as a plastic or stiffened, reinforced cardboard sheet for use in constructing a tray assembly.

b) cutting the sheet to form a base panel having a pair of side panel tabs on opposing sides of the base panel. The base panel is further cut to have an attachment panel positioned between the pair of side panel tabs.

c) cutting a pair of side panel tab receiving slots in the attachment panel.

d) cutting and shaping an end portion of each of the side panel tabs to engage removably one of the pair of side panel receiving slots of the attachment panel.

e) cutting a pair of generally J-shaped attachment tabs, preferably integral with the attachment panel and positioned on opposing sides of a top portion of the attachment panel. Each of the J-shaped attachment tabs folds along a crease between a flat configuration and a downwardly extending configuration from the attachment panel to form a hook. The downwardly extending hook is shaped to engage a railing edge, window pane, or steering wheel for suspending the tray.

f) forming a pair of side panel tab creases in the side panel tabs. Each of the side panel tab creases are formed between the base panel and the end portion of the side panel tab.

h) forming an attachment panel crease between the base panel and the attachment panel so that a generally horizontal tray can be formed by angling the attachment and base panels.

While only a certain preferred embodiment of this invention has been described, it is understood that many variations are possible without departing from the principles of this invention as defined by the claims which follow. Accordingly, while the invention has been described with reference to at least one preferred embodiment, it is to be clearly understood by those skilled in the art that the invention being claimed is not limited thereto. Rather, the scope of the invention is to be interpreted only in conjunction with the appended claims.

I claim:

1. A tray adapted for suspension from a railing edge, the tray comprising:

a base panel of flexible material having a pair of side panel tabs, each of the pair of side panel tabs being integral with the base panel and positioned on opposing sides of the base panel and extending partially therealong, each of the pair of side panel tabs folding along a side panel crease between a flat configuration and an upwardly extending configuration with respect to said base panel;

an attachment panel that is integral with a top portion of the base panel and positioned between the pair of side panel tabs, said attachment panel folding along an attachment panel crease between a flat configuration and an angled configuration with respect to said base panel;

an end portion of each of the pair of side panel tabs shaped to engage removably one of a pair of side panel tab receiving slots located on said attachment panel by insertion thereinto, to lock each of the pair of side panel tabs in a fixed configuration for holding said attachment panel in an angled configuration to said base panel, said end portion of each of the pair of side panel tabs shaped to allow a user to select the amount said tab end is inserted into said receiving slot on said attachment panel to allow the user to select the angle formed between said attachment panel and said base panel in said angled configuration by selectively varying the amount said end portion is inserted into said receiving slot on said attachment panel, each of said side panel tabs further having a tab folding crease intermediate said side panel crease and said side panel tab end portion to allow said base panel to be folded into a flat, collapsed configuration generally parallel said attachment panel when said side panel tabs are held in said side tab receiving slots in said attachment panel; and, a pair of generally J-shaped attachment tabs, being integral with said attachment panel and positioned on opposing sides of a top portion of said attachment panel, each of the pair of J-shaped attachment tabs folding along a crease between a flat configuration and a downwardly extending configuration from said attachment panel to form a hook, said downwardly extending hook adapted to engage a railing edge for suspending the tray therefrom.

2. A tray as in claim 1, further comprising:

A slot forming a flap usable as a handle for a human hand to hold and carry said tray assembly.

3. A tray as in claim 2, further comprising:

A hinge mounted on the attachment panel free to pivot outwardly from a first position adjacent the attachment panel to a second extended position away from the attachment panel to provide a stand for said supporting tray assembly in an upright position on a generally flat surface, said outwardly pivoted hinge in said second, extended position away from the attachment panel acting as a supporting member between said generally flat surface and the attachment panel to support the attachment panel in an upright position.

4. A tray as in claim 3, further comprising:

A bracket mounted on the attachment panel proximate said hinge having at least one slot formed therein for receiving and securing therein said hinge in the second, outwardly extending position by a snap-locking fit.

5. A tray adapted for suspension from a railing edge, the tray comprising:

a base panel having a pair of side panel tabs, each of the pair of side panel tabs being integral with the base panel and positioned on opposing sides of the base panel and extending partially therealong, each of the pair of side panel tabs folding along a side panel crease between a flat configuration and an upwardly extending configuration with respect to said base panel;

an attachment panel that is integral with a top portion of the base panel and positioned between the pair of side panel tabs, said attachment panel folding along an attachment panel crease between a flat configuration and an angled configuration with respect to said base panel;

an end portion of each of the pair of side panel tabs shaped to engage removably by insertion into one of a pair of side panel tab receiving slots located on said attachment panel to lock each of the pair of side panel tabs in a fixed configuration for holding said attachment panel in an angled configuration to said base panel, said end portion of each of the pair of side panel tabs being further adapted to allow a user to select the amount said tab end is inserted into said receiving slot on said attachment panel to allow the user to select the angle formed between said attachment panel and said base panel in said angled configuration by selectively varying the amount said end portion is inserted into said receiving slot on said attachment panel; and, a pair of generally J-shaped attachment tabs, being integral with said attachment panel and positioned on opposing sides of a top portion of said attachment panel, each of the pair of J-shaped attachment tabs folding along a crease between a flat configuration and a downwardly extending configuration from said attachment panel to form a hook, said downwardly extending hook adapted to engage a railing edge for suspending the tray therefrom.

6. The tray of claim 5 wherein the tray is constructed of a single flexible sheet.

7. The tray of claim 5 further comprising each of said side panel tabs having a tab folding crease intermediate said side panel crease and said side panel tab end portion to allow said base panel to be folded into a flat, collapsed configuration generally parallel said attachment panel when said side panel tabs are held in said side tab receiving slots in said attachment panel.

8. A tray adapted for suspension from a railing edge, the tray comprising:
- a base panel having a pair of side panel tabs, each of the pair of side panel tabs being integral with the base panel and positioned on opposing sides of the base panel and extending partially therealong, each of the pair of side panel tabs folding along a side panel crease between a flat configuration and an upwardly extending configuration with respect to said base panel, each of said side panel tabs having an end portion;
- an attachment panel that is integral with a top portion of the base panel and positioned between the pair of side panel tabs, said attachment panel folding along an attachment panel crease between a flat configuration and an angled configuration with respect to said base panel;
- an end portion of each of the pair of side panel tabs shaped to engage removably one of a pair of side panel tab receiving slots located on said attachment panel by insertion thereinto and being further adapted to allow a user to select the amount said tab end is inserted into said receiving slot on said attachment panel to allow the user to select the angle formed between said attachment panel and said base panel in said angled configuration; and,
- a pair of generally J-shaped attachment tabs, being integral with said attachment panel and positioned on opposing sides of a top portion of said attachment panel, each of the pair of J-shaped attachment tabs folding along a crease between a flat configuration and a downwardly extending configuration from said attachment panel to form a hook, said downwardly extending hook adapted to engage a railing edge for suspending the tray therefrom.

9. A tray as in claim 8, further comprising:
A slot forming a flap usable as a handle for a human hand to hold and carry said tray assembly.

10. A tray as in claim 8, further comprising:
A hinge mounted on the attachment panel free to pivot outwardly from a first position adjacent the attachment panel to a second extended position away from the attachment panel to provide a stand for said supporting tray assembly in an upright position on a generally flat surface, said outwardly pivoted hinge in said second, extended position away from the attachment panel acting as a supporting member between said generally flat surface and the attachment panel to support the attachment panel in an upright position.

11. A tray as in claim 8, further comprising:
A bracket mounted on the attachment panel proximate said hinge for securing said hinge in the second, outwardly extending position by a snap-locking fit.

12. The tray of claim 8 wherein said means for means for attaching said end portion of each of the pair of side panel tabs to said attachment panel comprises a hook and loop material.

13. The tray of claim 8 wherein said means for means for attaching said end portion of each of the pair of side panel tabs to said attachment panel comprises an adhesive tape.

14. The tray of claim 8 wherein said means for means for attaching said end portion of each of the pair of side panel tabs to said attachment panel comprises a snap arrangement.

15. The tray of claim 8 wherein the tray is constructed of a single flexible sheet.

* * * * *